United States Patent
Schuster et al.

(10) Patent No.: US 11,353,074 B2
(45) Date of Patent: Jun. 7, 2022

(54) BRAKE ROTOR FOR A BRAKING SYSTEM OF A MOTOR VEHICLE

(71) Applicant: GM Global Technology Operations LLC, Detroit, MI (US)

(72) Inventors: Steven J Schuster, Farmington, MI (US); Matthew A Robere, Novi, MI (US); Kevin P Callaghan, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 72 days.

(21) Appl. No.: 16/928,579

(22) Filed: Jul. 14, 2020

(65) Prior Publication Data

US 2022/0018410 A1    Jan. 20, 2022

(51) Int. Cl.
*F16D 65/12* (2006.01)
*F16D 65/00* (2006.01)
*F16D 65/02* (2006.01)

(52) U.S. Cl.
CPC ....... *F16D 65/123* (2013.01); *F16D 65/0006* (2013.01); *F16D 2065/1308* (2013.01); *F16D 2065/138* (2013.01); *F16D 2065/1384* (2013.01)

(58) Field of Classification Search
CPC ......... B22D 15/00; B22D 19/04; F16D 65/12; F16D 65/123–128
USPC .......................................... 188/18 A, 218 XL
See application file for complete search history.

(56) References Cited

U.S. PATENT DOCUMENTS

| | | | |
|---|---|---|---|
| 6,401,880 B1 | 6/2002 | Zahdeh | |
| 6,598,716 B1* | 7/2003 | Ihm | B23P 15/00 |
| | | | 188/218 XL |
| 6,672,679 B2* | 1/2004 | Kaneko | B60B 3/04 |
| | | | 301/105.1 |
| 7,934,777 B1* | 5/2011 | Yuhas | B60B 3/16 |
| | | | 301/6.8 |
| 8,668,058 B2 | 3/2014 | Lu et al. | |
| 9,188,180 B2* | 11/2015 | Webster | F16D 65/12 |
| 2010/0206674 A1 | 8/2010 | Monsere et al. | |
| 2011/0187179 A1* | 8/2011 | Zwarts | B60B 27/0005 |
| | | | 301/105.1 |
| 2018/0142745 A1* | 5/2018 | Chung | F16D 65/125 |

FOREIGN PATENT DOCUMENTS

| | | |
|---|---|---|
| DE | 10228416 A1 | 1/2004 |
| DE | 10260467 A1 | 7/2004 |
| DE | 102011112230 A1 | 3/2013 |

* cited by examiner

*Primary Examiner* — Christopher P Schwartz
(74) *Attorney, Agent, or Firm* — Vivacqua Crane, PLLC

(57) ABSTRACT

A brake rotor for a braking system of a motor vehicle is provided. The brake rotor includes a disc section for rotating about a longitudinal axis and engaging a brake pad assembly. The brake rotor further includes a hat section for attaching to a wheel. The hat section has a stepped surface spaced from the disc section along the longitudinal axis, and the stepped surface defines a recess for spacing the wheel and a portion of the stepped surface from one another when the wheel is attached to the hat section.

18 Claims, 9 Drawing Sheets

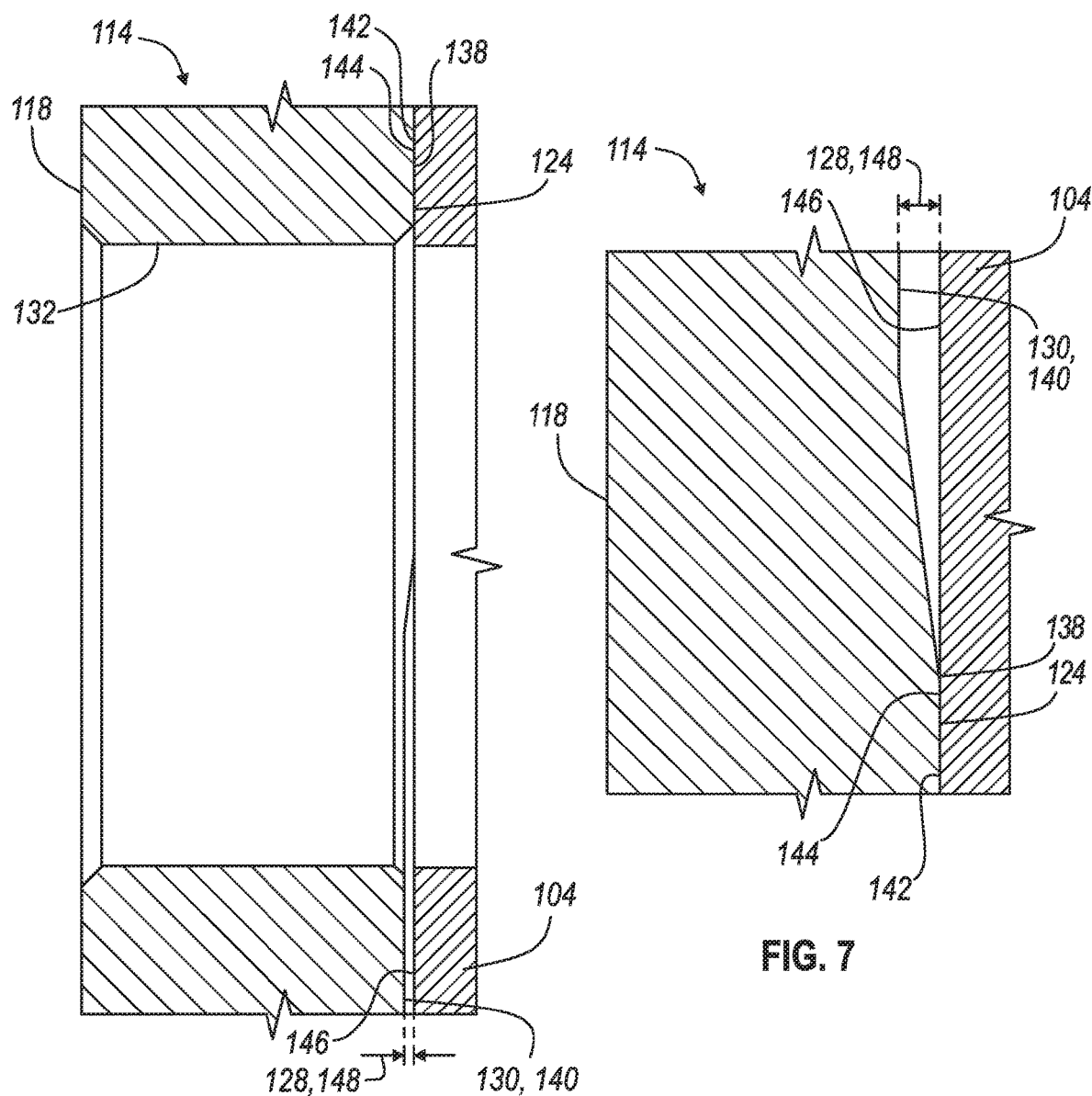

BRAKE ROTOR FOR A BRAKING SYSTEM OF A MOTOR VEHICLE

INTRODUCTION

The present disclosure relates to brake rotors of brake systems for motor vehicles, and more particularly, to a brake rotor having a hat section with a stepped surface for mounting a wheel and preventing an associated noise condition.

A brake rotor has a hat section including a rotor surface for wheel mounting that faces and directly supports a mating surface of a wheel. The rotor surface for wheel mounting can define a pilot hole for receiving a hub bearing assembly, and the rotor surface for wheel mounting can further have a plurality of holes arranged about the pilot hole for receiving bolt members, such as studs, for holding the mating surface of the wheel against the rotor surface for wheel mounting. The rotor surface for wheel mounting typically has a planar surface that extends from an outer periphery of the rotor surface for wheel mounting to the pilot hole, such that the entire planar surface directly contacts and supports the mating surface of the wheel. However, the planar surface and the mating surface can move relative to one another and create a noise condition. In one example, the noise condition can occur when the car is moving forward or in reverse with the steering wheel turned to full or partial lock. The relative motion can cause a stick-slip condition that can sound like a repeated clicking noise as the wheel rotates.

Thus, while brake rotors achieve their intended purpose, there is a need for a new and improved brake rotor that addresses these issues.

SUMMARY

According to several aspects, a brake rotor for a braking system of a motor vehicle includes a disc section for rotating about a longitudinal axis and engaging a brake pad assembly. The brake rotor further includes a hat section having a stepped surface for contacting and attaching to a wheel. The stepped surface is spaced from the disc section along the longitudinal axis. The stepped surface defines a recess for spacing the wheel and a portion of the stepped surface from one another to prevent a noise condition when the wheel is attached to the hat section.

In one aspect, the stepped surface further includes a plurality of holes for receiving an associated one of a plurality of bolt members and attaching the wheel to the hat section, with the holes being separate from the recess and adjacent to the recess.

In another aspect, the stepped surface further includes at least one of a countersunk opening and a counterbore opening that are separate from the recess and adjacent to the recess.

In another aspect, the disc section includes an outboard surface for engaging the brake pad assembly, and the stepped surface includes a first annular surface portion for engaging the wheel when the wheel is attached to the hat section. The first annular surface portion is disposed about the longitudinal axis and positioned parallel with the outboard surface of the disc section. The stepped surface further includes a second annular surface portion that is positioned radially inward from the first annular surface portion toward the longitudinal axis. The second annular surface portion is spaced from the first annular surface portion along the longitudinal axis to define the recess in the stepped surface.

In another aspect, the second annular surface portion is spaced 0.15 millimeters from the first annular surface portion.

In another aspect, each of the first and second annular surface portions has an outer profile and an inner profile relative to the longitudinal axis, with the outer profile of the first annular surface portion being circular.

In another aspect, the holes are positioned along the outer profile of the second annular surface portion.

In another aspect, the inner profile of the first annular surface portion and the outer profile of the second annular surface portion are circular.

In another aspect, the hat section and the disc section form a single-piece body.

In another aspect, the hat section and the disc section are two separate components that are attached to one another.

According to several aspects, a braking system of a motor vehicle includes a brake pad assembly, a wheel, and a brake rotor that includes a disc section for rotating about a longitudinal axis and being engaged by the brake pad assembly. The brake rotor further includes a hat section having a stepped surface for contacting and attaching to the wheel. The stepped surface is spaced from the disc section along the longitudinal axis. The stepped surface defines a recess for spacing the wheel and a portion of the stepped surface from one another to prevent a noise condition when the wheel is attached to the hat section.

In one aspect, the brake rotor further includes a hub bearing assembly, and the stepped surface further includes a plurality of holes that are separate from the recess, with the holes receiving the associated bolt members for attaching the wheel to the hat section.

In another aspect, the holes are adjacent to the recess.

In another aspect, the stepped surface further includes at least one of a countersunk opening and a counterbored opening that are separate from the recess.

In another aspect, the countersunk opening and the counterbore opening are adjacent to the recess.

In another aspect, the disc section includes an outboard surface for engaging the brake pad assembly, and the stepped surface includes a first annular surface portion for engaging the wheel when the wheel is attached to the hat section. The first annular surface portion is disposed about the longitudinal axis and positioned parallel with the outboard surface of the disc section. The stepped surface further includes a second annular surface portion that is positioned radially inward from the first annular surface portion toward the longitudinal axis. The second annular surface portion is spaced from the first annular surface portion along the longitudinal axis to define the recess in the stepped surface.

In another aspect, the wheel has a planar surface with an outer section and an inner section circumferentially surrounded by the outer section. The outer section directly engages the first annular surface portion of the hat section, and the inner section is spaced from the second annular surface section when the wheel is attached to the hat section, such that the inner section and the second annular surface section define a clearance gap between one another.

In another aspect, each of the first and second annular surface portions has an outer profile and an inner profile relative to the longitudinal axis, with the outer profile of the first annular surface portion being circular.

According to several aspects, a method of manufacturing a brake rotor for a braking system of a motor vehicle includes providing a brake rotor having a disc section for rotating about a longitudinal axis and engaging a brake pad assembly. The brake rotor further includes a hat section for attaching to a wheel. The method further includes machining a stepped surface into the hat section, such that the stepped surface is spaced from the disc section along the longitudinal axis, and the stepped surface defines a recess for spacing the wheel and a portion of the stepped surface from one another when the wheel is attached to the hat section.

In one aspect, the method further includes attaching the hat section to the disc section.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

FIG. 6 is an enlarged view of the brake rotor of FIG. 5 as taken from circle 6, illustrating the brake rotor having a stepped surface that defines a recess with one of the holes being adjacent to the recess.

FIG. 7 is an enlarged view of the brake rotor of FIG. 5 as taken from circle 7, illustrating the stepped surface defining the recess.

DETAILED DESCRIPTION

Figure 1:
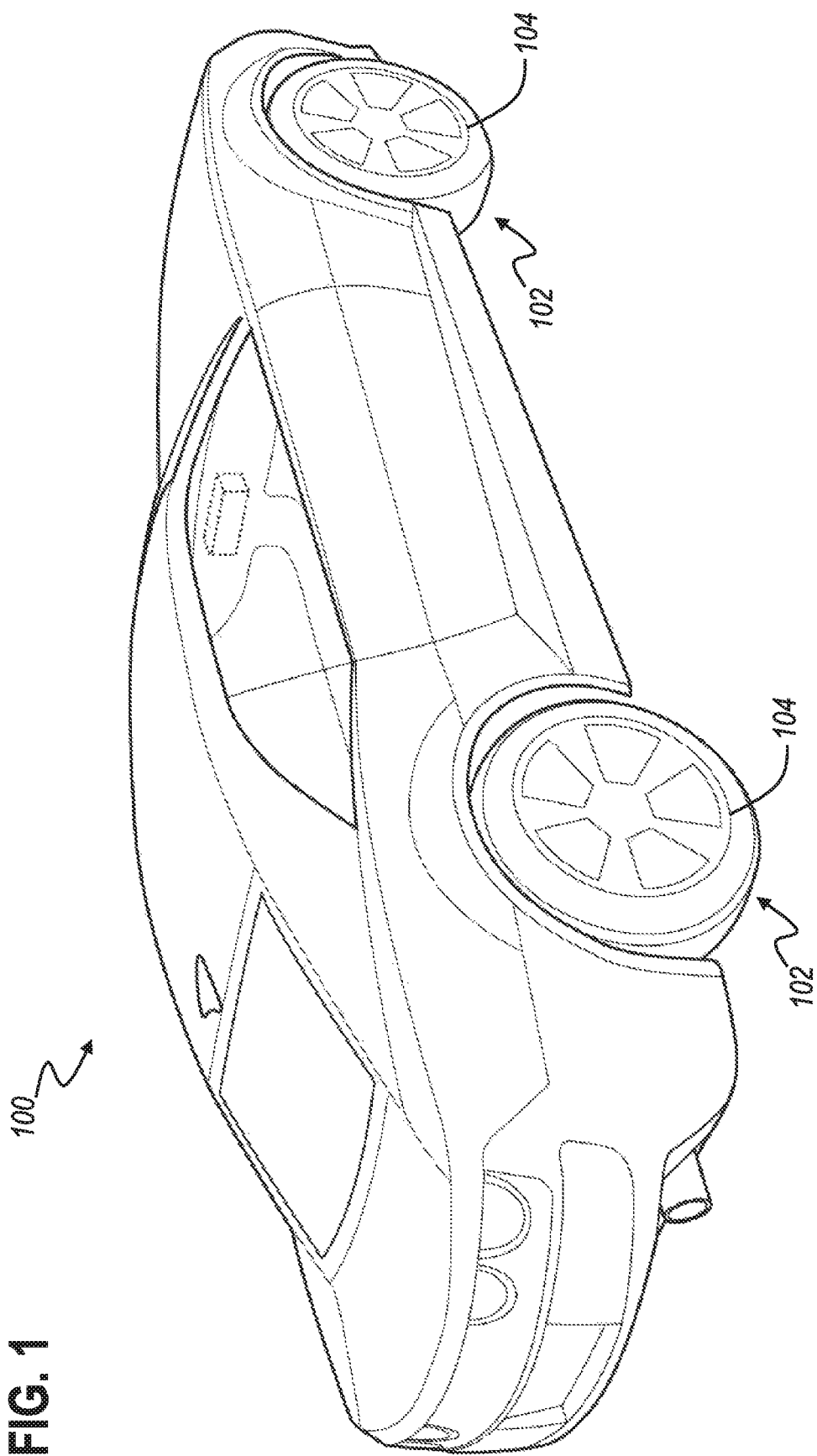
FIG. 1 is a perspective view of a motor vehicle having a plurality of wheels and a braking system for each wheel.

Referring now to the drawings, exemplary illustrations are shown in detail. Although the drawings represent examples, the drawings are not necessarily to scale and certain features may be exaggerated to better illustrate and explain a particular aspect of an illustrative example. Any one or more of these aspects can be used alone or in combination within one another. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

Referring to FIG. 1, a motor vehicle 100 has a braking system 102 including a plurality of wheels 104. In this example, the motor vehicle 100 is a sports car. However, it is contemplated that the motor vehicle can be a truck, a van, a sports utility vehicle, a family sedan, or any other vehicle.

Figure 2:
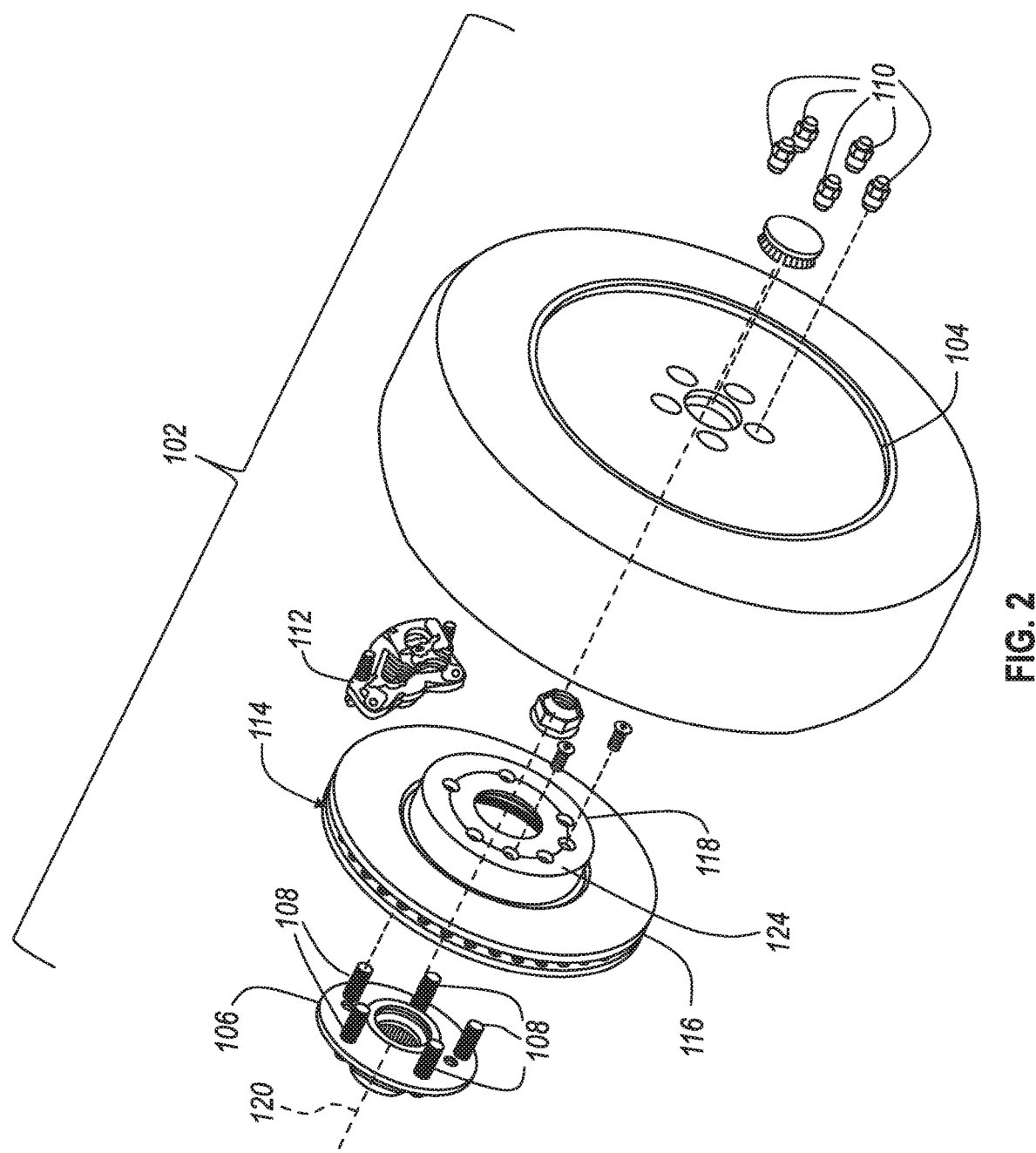
FIG. 2 is an exploded view of one of the braking systems of FIG. 1, illustrating the braking system having a brake pad assembly, a brake rotor, a hub bearing assembly, rotor fasteners, and a plurality of bolt members and nuts for attaching the wheel to the brake rotor.

Referring to FIG. 2, the braking system 102 includes a hub bearing assembly 106 having a plurality of bolt members 108 and a plurality of nuts 110 for fastening to an associated one of the bolt members 108. The bolt members 108 can be externally threaded studs without heads, externally threaded bolts with heads, or other suitable externally threaded bolt members. The nuts 110 can be lug nuts or other suitable internally threaded nuts for engaging the bolt members 108. It is contemplated that the hub bearing assembly can include any suitable fasteners.

The braking system 102 further includes a brake pad assembly 112 connected to and actuated by an actuator (not shown). In one example, the actuator can be a hydraulic brake circuit (not shown) connected to and actuated by a brake pedal (not shown) or controller (not shown). In another example, the actuator can be an electric brake circuit connected to and actuated by a brake pedal or controller. However, it is contemplated that the brake pad assembly can be connected to and actuated by any suitable actuator.

Referring to FIG. 2, the exemplary braking system 102 further includes a brake rotor 114 attached to each hub bearing assembly 106 for the associated wheel 104. The bolt members 108 and the nuts 110 attach the wheel 104 and the brake rotor 114 to the associated hub bearing assembly 106 as will be described in more detail below.

Figure 3:
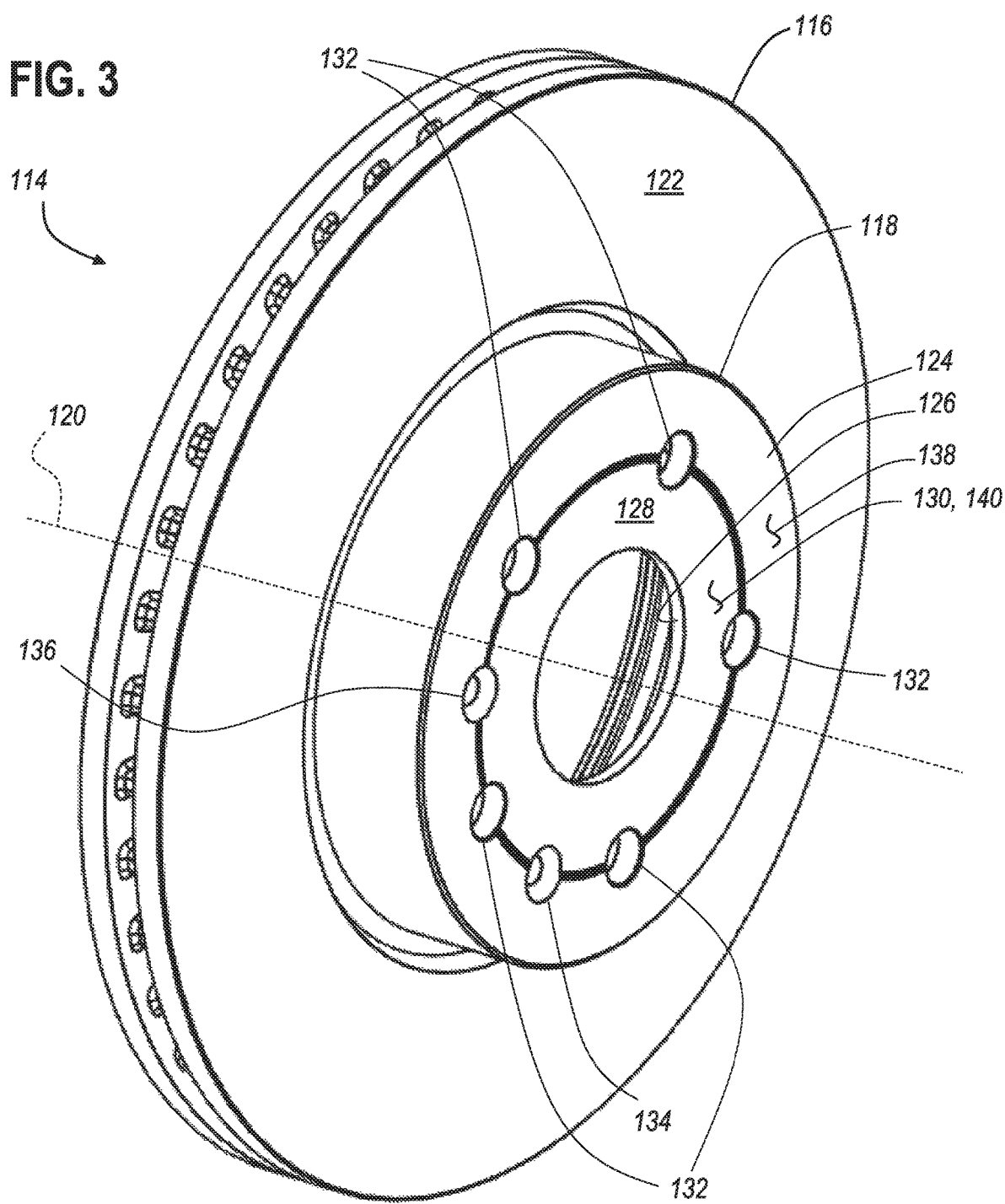
FIG. 3 is a perspective view of the brake rotor of FIG. 2.
Figure 4:
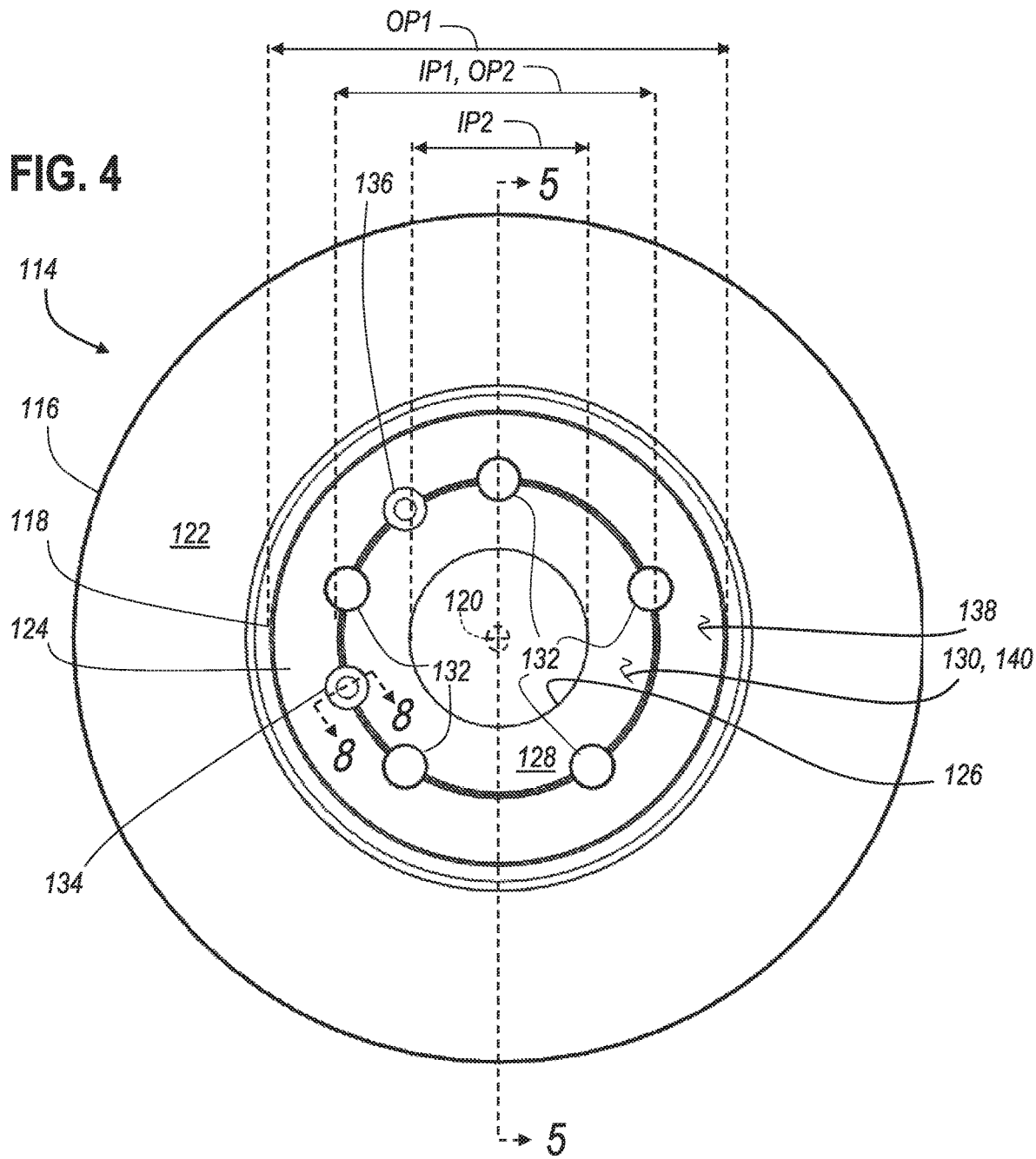
FIG. 4 is a face view of the brake rotor of FIG. 3, illustrating the brake rotor having a plurality of holes for receiving the bolt members.
Figure 5:
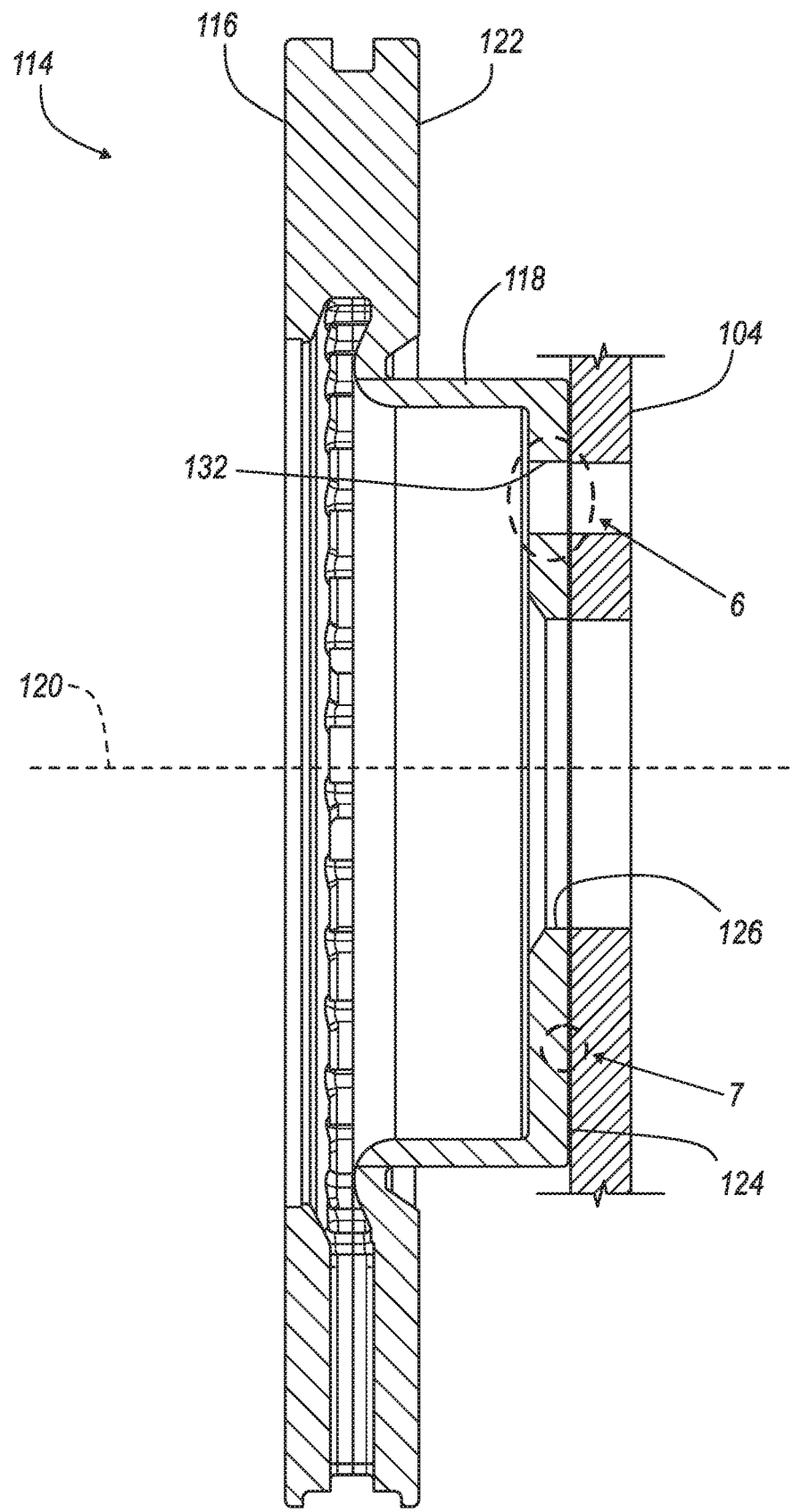
FIG. 5 is a cross-sectional view of the brake rotor of FIG. 4 as taken along line 5-5, illustrating the brake rotor having a single-piece body with the wheel being mounted to the brake rotor.

Referring to FIGS. 3-5, the exemplary brake rotor 114 is a single-piece full cast iron rotor including a disc section 116 and a hat section 118 attached to the hub bearing assembly and wheel, such that the disc section 116 rotates about the axis 120. It is contemplated that the brake rotor can include any number of components attached to one another and made of any suitable materials. The disc section 116 has an outboard surface 122 being clamped and engaged by the brake pad assembly 112 (FIG. 2) to slow and stop rotation of the wheel.

Figure 8:
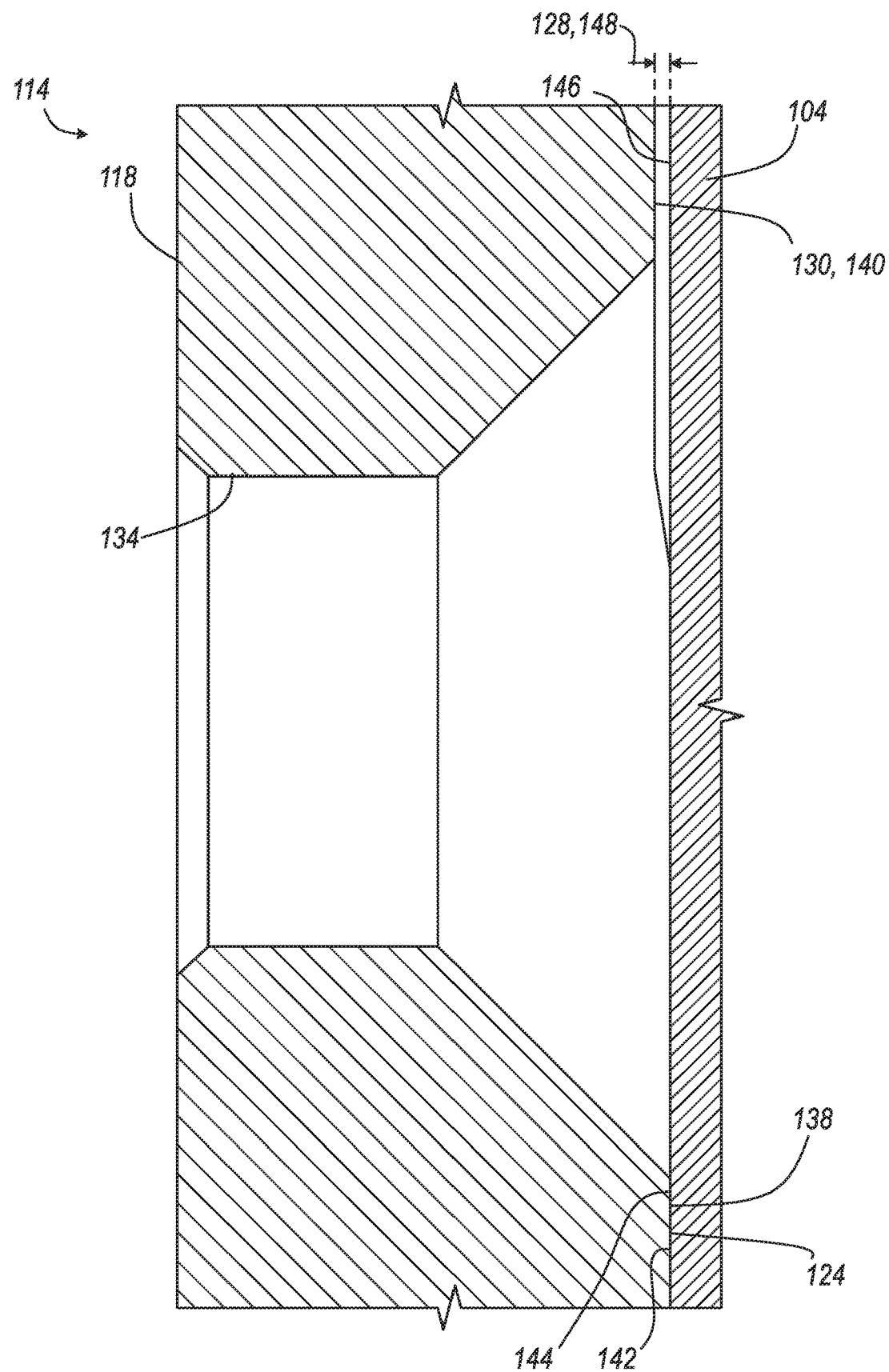
FIG. 8 is cross-sectional view of the brake rotor of FIG. 4 as taken along line 8-8, illustrating one of the holes having a countersunk opening with the wheel being mounted to the brake rotor.

Referring to FIGS. 5-8, the hat section 118 has a stepped surface 124 for contacting and attaching to the wheel 104. As best shown in FIG. 5, the stepped surface 124 is spaced from the disc section 116 along the longitudinal axis 120, with the stepped surface 124 defining a pilot opening 126 for receiving the hub bearing assembly 106. As best shown in FIGS. 6-8, the stepped surface 124 further defines a recess 128, such that the wheel 104 and a portion 130 of the stepped surface 124 are spaced from one another when the wheel 104 is attached to the hat section 118. The stepped surface 124 further includes a plurality of holes 132 for receiving the bolt members and attaching the wheel 104 to the hat section 118. The holes 132 are adjacent to the recess 128 in a direction of depth into the hat section 118 and in a direction lateral along the stepped surface 124 of the hat section 118. The stepped surface 124 can further include a countersunk opening 134 (FIGS. 4 and 8) and a counterbored opening 136 (FIG. 4) that are separate from the recess 128 and receive associated rotor fasteners for attaching the brake rotor 114 to the hub bearing assembly 106 (FIG. 2). The countersunk opening 134 and the counterbored opening 136 are adjacent to the recess 128 in a direction of depth into the hat section and in a direction lateral along the stepped surface 124 of the hat section 118. While this example of the stepped surface 124 includes one countersunk opening and one counterbored opening, other examples of the stepped surface can have only the countersunk opening, only the counterbored opening, or neither one of the openings. It is contemplated that the stepped surface can have any number of holes, countersunk openings, and counterbored openings arranged in any position adjacent to or spaced from the recess.

Referring to FIGS. 6-8, the stepped surface 124 includes a first annular surface portion 138 for engaging the wheel 104 when the wheel 104 is attached to the hat section 118, with the first annular surface portion 138 disposed about the longitudinal axis 120 and positioned parallel with the outboard surface 122 (FIG. 5) of the disc section 116. The stepped surface 124 further includes a second annular surface portion 140 that is positioned radially inward from the first annular surface portion 138 toward the longitudinal axis 120. In addition, the second annular surface portion 124 is also spaced from the from the first annular surface portion 138 along the longitudinal axis 120. In this example, the second annular surface portion 140 is spaced 0.15 millimeters from the first annular surface portion 138 along the axis to define the recess 128. In another example, the first and second annular surface portions are spaced from one another by a distance within a range between 0.10 millimeters and 0.20 millimeters. In still another example, the first and second annular surface portions are spaced from one another by a distance within a range between 0.05 millimeters and 0.25 millimeters. However, it is contemplated that the first and second annular surface portions can be spaced from one another by any suitable distance that can be above or below 0.15 millimeters.

Referring again to FIG. 4, the first annular surface portion 138 has outer and inner profiles OP1, IP1 that are circular disposed about the axis 120. Also, in this example, the second annular surface portion 140 has outer and inner profiles OP2, IP2 that are circular and disposed about the axis 120. However, it is contemplated one or more of the outer and inner profiles for the first and second annular surface portions can have a suitable non-circular shape, which does not cause the brakes to pulse or result in other adverse effects. In this example, the holes 132 are positioned along the outer profile OP2 of the second annular surface portion 140.

As shown in FIGS. 6-8, in this example, the wheel 104 has a planar surface 142 with an outer section 144 and an inner section 146 circumferentially surrounded by the outer section 144. The outer section 144 directly engages the first annular surface portion 138 of the hat section 118, and the inner section 146 is spaced from the second annular surface section 140 when the wheel 104 is attached to the hat section 118, such that the inner section 146 and the second annular surface section 140 define a clearance gap 148 between one another. The gap 148 between the inner section 146 and the second annular surface portion 140 can prevent the noise condition when the wheel 104 is attached to the hat section 118.

Figure 9:
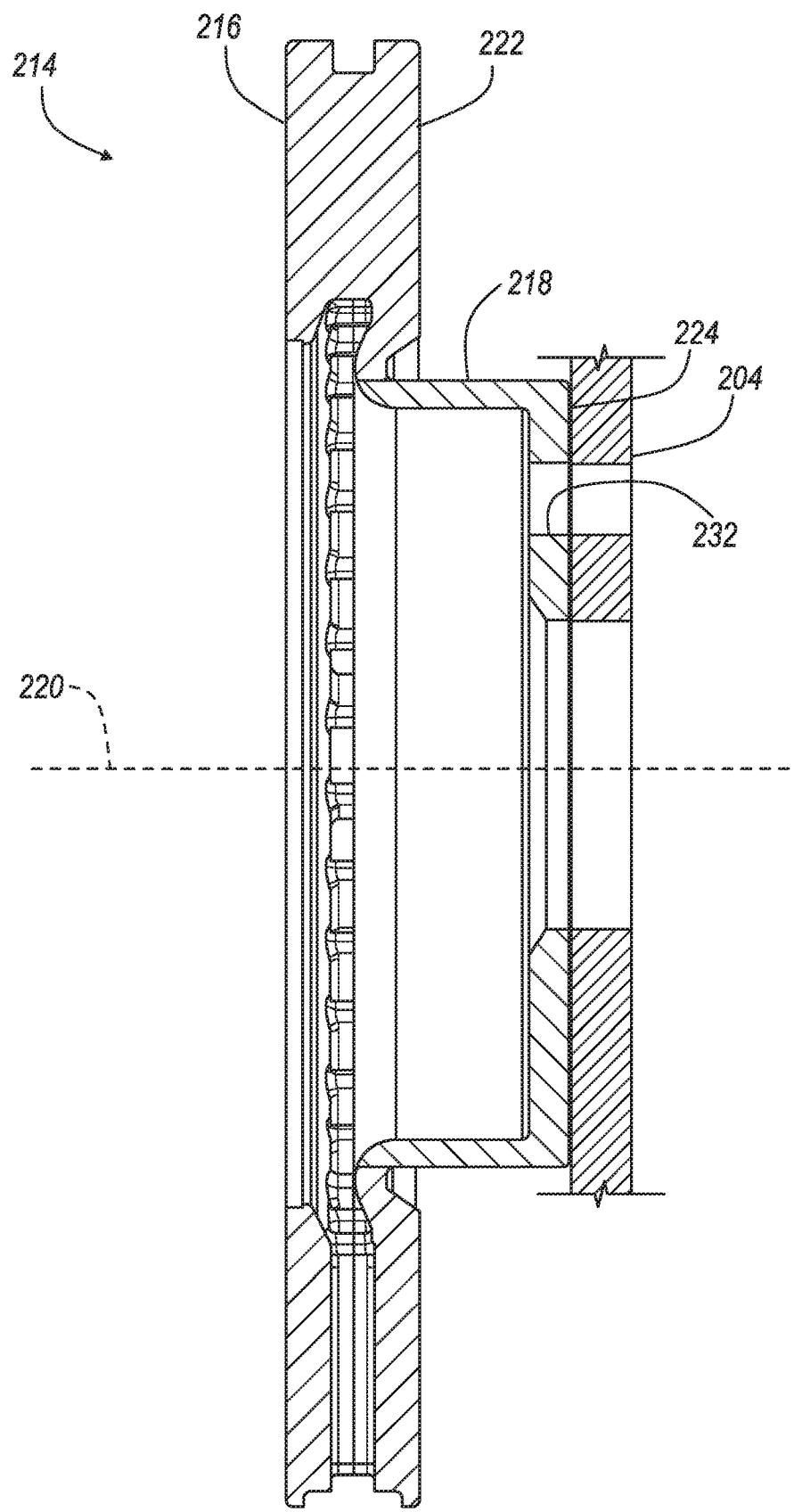
FIG. 9 is a cross-sectional view of another example of a brake rotor of the braking system of FIG. 2, illustrating the brake rotor having a hat section and a disc section that are separate components attached to one another.

As shown in FIG. 9, another example of the brake rotor 214 is similar to the brake rotor of FIG. 5 and has similar components identified by the same numbers increased by 100. While the brake rotor 114 of FIG. 5 is a single-piece body, the brake rotor 214 is a two-piece rotor including a disc section 216 and a hat section 218, which are separate components attached to one another. The two-piece rotor 214 can include cast iron, composite, or other material for the disc section 216 and aluminum or other material for the hat section 218. It is contemplated that the brake rotor can include any number of components attached to one another and made of any suitable materials.

Figure 10:
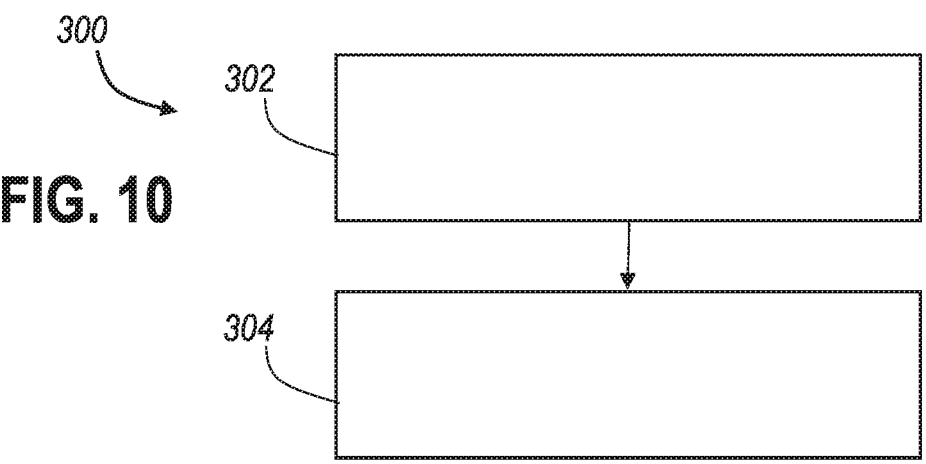
FIG. 10 is a flow chart of an exemplary method of manufacturing the brake rotor of FIG. 5.

Referring to FIG. 10, a method 300 of manufacturing the brake rotor 114 for of FIG. 5 is illustrated. The method 300 begins at block 302 with the step of providing the brake rotor 114 that has the disc section 116 for rotating about the longitudinal axis 120 and being engaged by the brake pad assembly 112. The brake rotor 114 further includes the hat section 118 for attaching to the wheel 104 and the hub bearing assembly 106.

At block 304, the hat section 118 is machined to form the stepped surface 124, with the stepped surface 124 being spaced from the disc section along the longitudinal axis 120. More specifically, the hat section 118 is machined to form the first and second annular surface portions 138, 140 to define the recess 128. The recess 128 spaces the wheel 104 and the second annular surface portion 140 from one another to prevent the noise condition when the wheel 104 is attached to and directly contacts the first annular surface portion 138 of the hat section 118.

Figure 11:
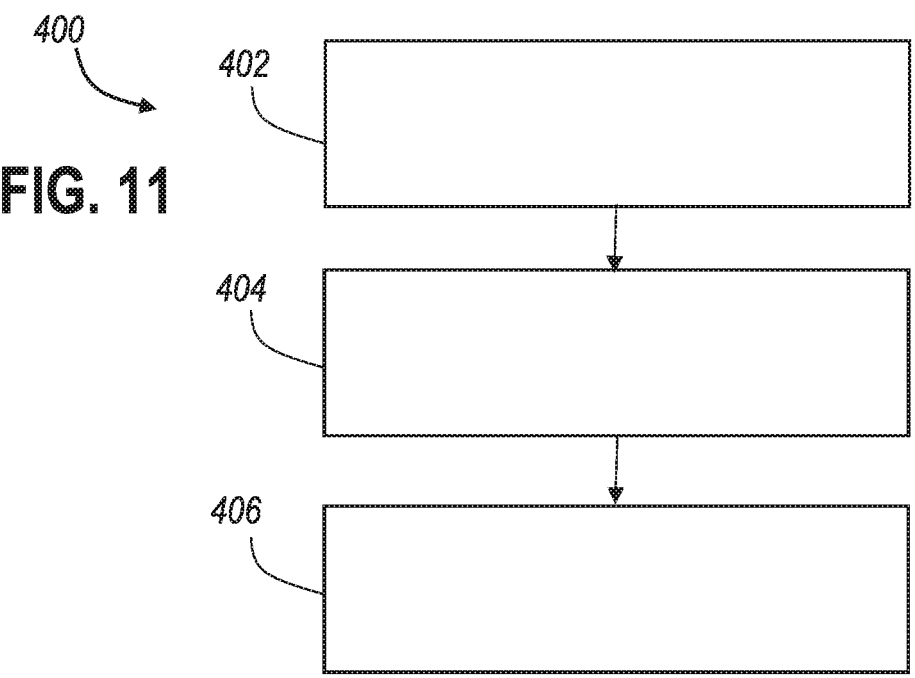
FIG. 11 is a flow chart of another exemplary method of manufacturing the brake rotor of FIG. 9.

Referring to FIG. 11, a method 400 of manufacturing the brake rotor 214 of FIG. 9 is similar to the method 300 of FIG. 10 and includes the same steps identified by numbers increased by 100. However, while the method 300 of FIG. 10 includes the block 302 where the single-piece rotor is provided, the method 400 includes the block 402 where the two-piece rotor 214 is provided with the disc section 216 and the hat section 218 as separate components. In addition, the method 400 further includes block 406 where the hat section 218 and the disc section 216 are attached to one another.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A brake rotor for a braking system of a motor vehicle, the brake rotor comprising:
   a disc section for rotating about a longitudinal axis, with the disc section having an outboard surface for engaging a brake pad assembly; and
   a hat section having a stepped surface for contacting and attaching to a wheel, the stepped surface being spaced from the disc section along the longitudinal axis and defining a recess for spacing the wheel and a portion of the stepped surface from one another to prevent a noise condition when the wheel is attached to the hat section;
   wherein the stepped surface that defines the recess comprises:
      a first annular surface portion for engaging the wheel when the wheel is attached to the hat section, with the first annular surface portion disposed about the longitudinal axis and positioned parallel with the outboard surface of the disc section; and
      a second annular surface portion that is positioned radially inward from the first annular surface portion toward the longitudinal axis, and the second annular surface portion is spaced from the first annular surface portion along the longitudinal axis to define the recess.

2. The brake rotor of claim 1 wherein the stepped surface further includes a plurality of holes for receiving an associated one of a plurality of bolt members and attaching the wheel to the hat section, with the holes being separate from the recess and adjacent to the recess.

3. The brake rotor of claim 2 wherein at least one of a countersunk opening and a counterbore opening that are separate from the recess and adjacent to the recess.

4. The brake rotor of claim 1 wherein each of the first and second annular surface portions has an outer profile and an inner profile relative to the longitudinal axis, with the outer profile of the first annular surface portion being circular.

5. The brake rotor of claim 2 wherein the holes are positioned along the outer profile of the second annular surface portion.

6. The brake rotor of claim 4 wherein the inner profile of the first annular surface portion and the outer profile of the second annular surface portion are circular.

7. The brake rotor of claim 4 wherein the hat section and the disc section comprise a single-piece body.

8. The brake rotor of claim 4 wherein the hat section and the disc section comprise two components attached to one another.

9. The brake rotor of claim 1 wherein the second annular surface portion is spaced 0.15 millimeters from the first annular surface portion.

10. A braking system of a motor vehicle, the braking system comprising:
    a brake pad assembly;
    a wheel; and
    a brake rotor comprising:
        a disc section for rotating about a longitudinal axis, with the disc section having an outboard surface for engaging the brake pad assembly; and
        a hat section having a stepped surface for attaching to the wheel, the stepped surface being spaced from the disc section along the longitudinal axis and defining a recess for spacing the wheel and a portion of the stepped surface from one another to prevent a noise condition when the wheel is attached to the hat section;
    wherein the stepped surface that defines the recess comprises:
        a first annular surface portion for engaging the wheel when the wheel is attached to the hat section, with the first annular surface portion disposed about the longitudinal axis and positioned parallel with the outboard surface of the disc section; and
        a second annular surface portion that is positioned radially inward from the first annular surface portion toward the longitudinal axis, and the second annular surface portion is spaced from the first annular surface portion along the longitudinal axis to define the recess.

11. The braking system of claim 10 further comprising a hub bearing assembly having a plurality of bolt members, wherein the stepped surface further includes a plurality of holes that are separate from the recess, with the holes for receiving the bolt members and attaching the wheel to the hat section.

12. The braking system of claim 11 wherein the stepped surface includes at least one of a countersunk opening and a counterbored opening that are separate from the recess.

13. The braking system of claim 12 wherein the countersunk opening and the counterbored opening are adjacent to the recess.

14. The braking system of claim 11 wherein the holes are adjacent to the recess.

15. The braking system of claim 10 wherein the wheel comprises a planar surface with an outer section and an inner section circumferentially surrounded by the outer section, wherein the outer section directly engages the first annular surface portion of the hat section and the inner section is spaced from the second annular surface portion when the wheel is attached to the hat section, such that the inner section and the second annular surface portion define a clearance gap between one another.

16. The braking system of claim 10 wherein each of the first and second annular surface portions has an outer profile and an inner profile relative to the longitudinal axis, with the outer profile of the first annular surface portion being circular.

17. A method of manufacturing a brake rotor for a braking system of a motor vehicle, the method comprising:
    providing the brake rotor having a disc section for rotating about a longitudinal axis with the disc section having an outboard surface for engaging a brake pad assembly, with the brake rotor further having a hat section for attaching to a wheel; and
    machining a stepped surface into the hat section such that the stepped surface is spaced from the disc section along the longitudinal axis, and the stepped surface that defines a recess comprises first and second annular surface portions for spacing the wheel and a portion of the stepped surface from one another when the wheel is attached to the hat section, with the first annular surface portion for engaging the wheel when the wheel is attached to the hat section, with the first annular surface portion disposed about the longitudinal axis and positioned parallel with the outboard surface of the disc section, and the second annular surface portion that is positioned radially inward from the first annular surface portion toward the longitudinal axis, and the second annular surface portion is spaced from the first annular surface portion along the longitudinal axis to define the recess.

18. The method of claim 17 further comprising attaching the hat section to the disc section.

* * * * *